Figure 3:
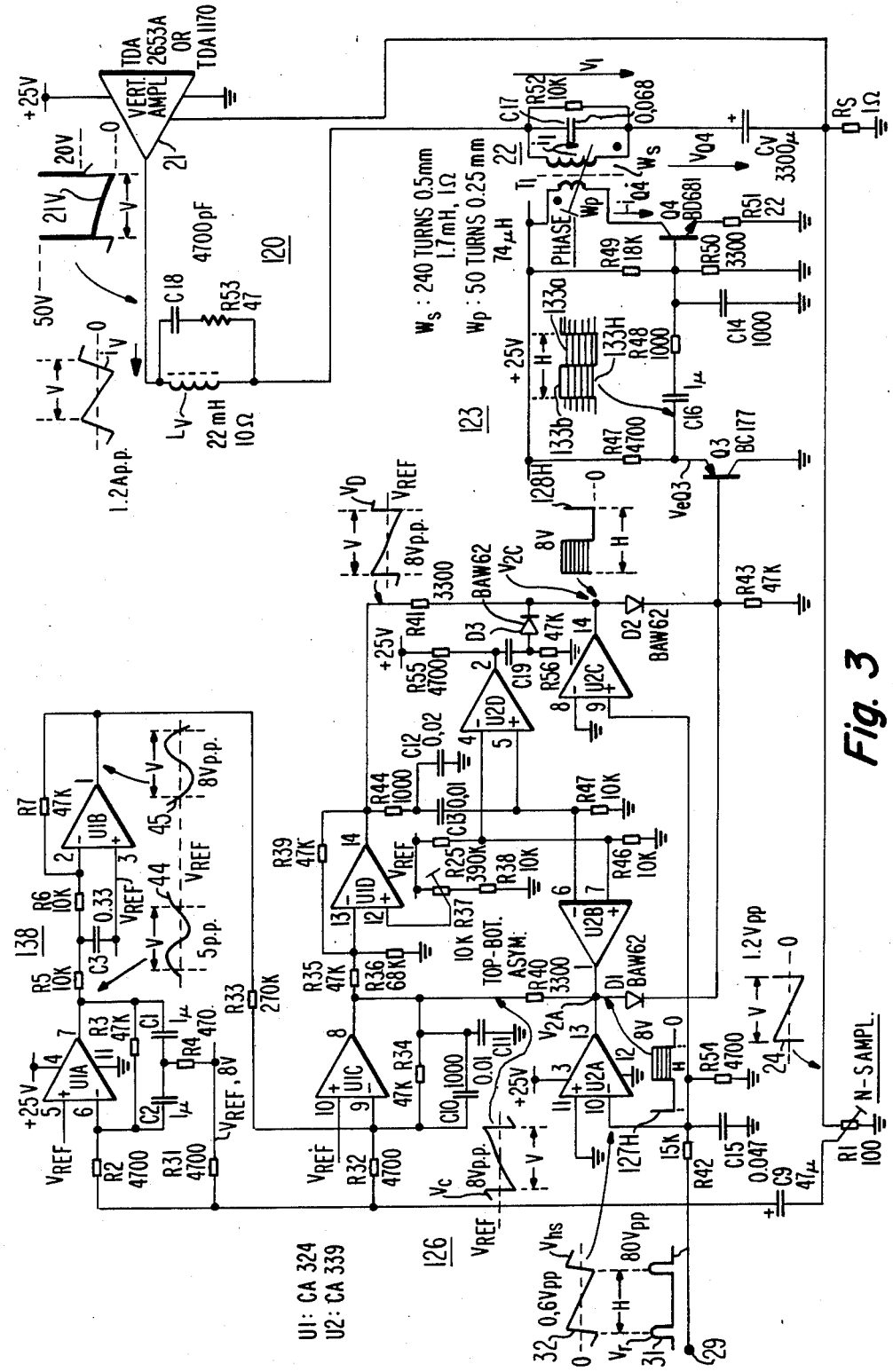
Figure 4:
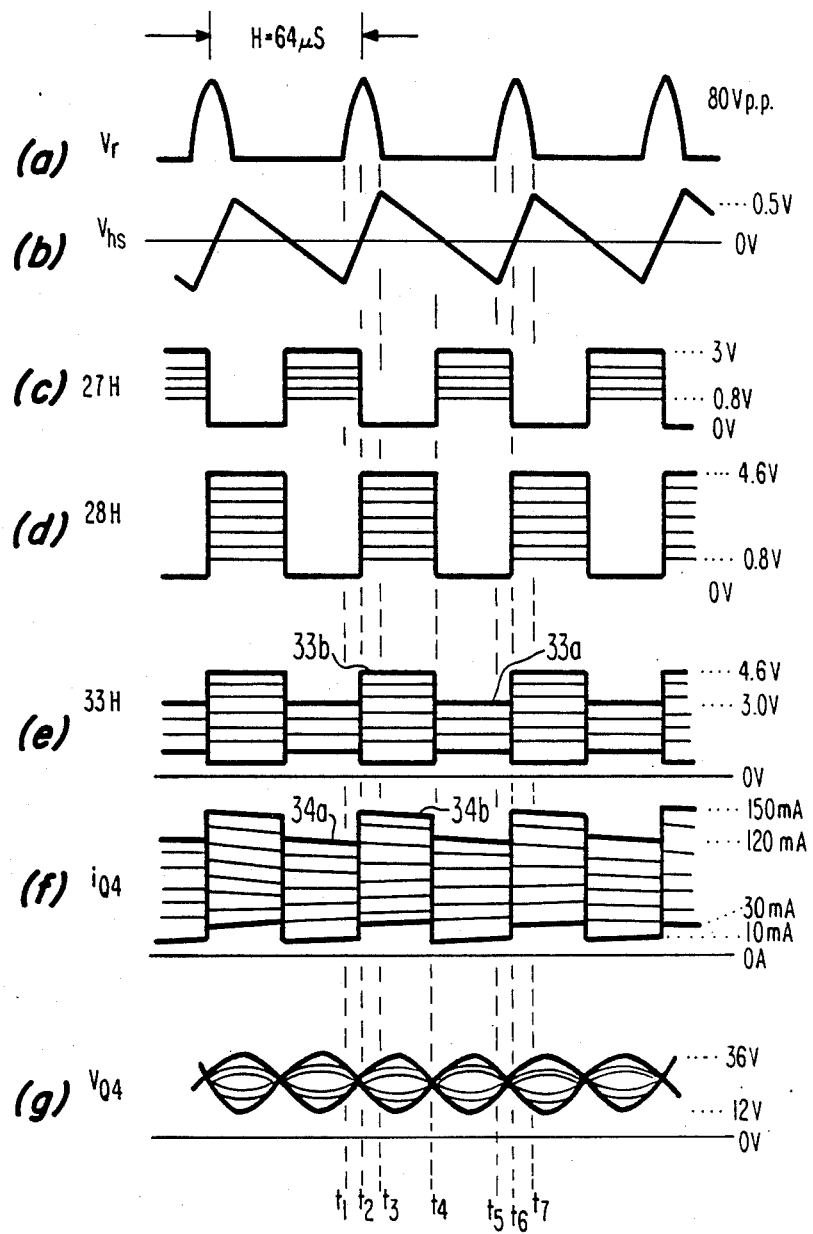
Figure 5:
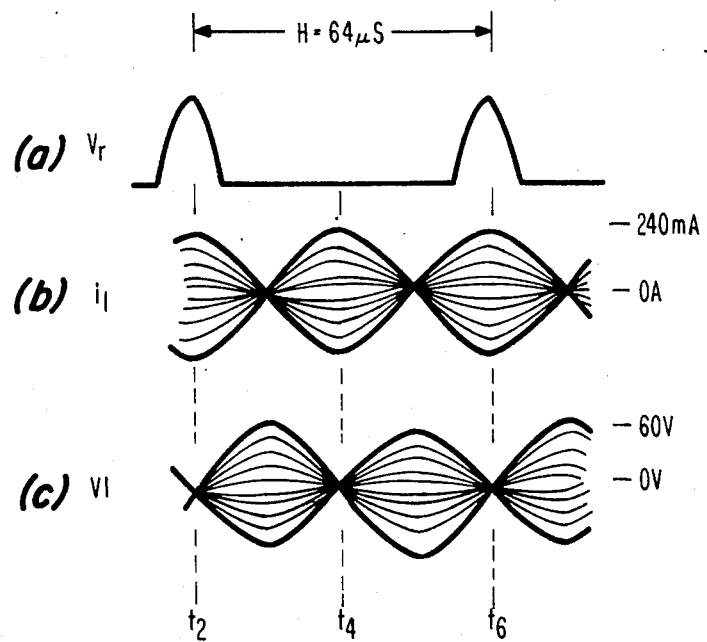
Figure 6:
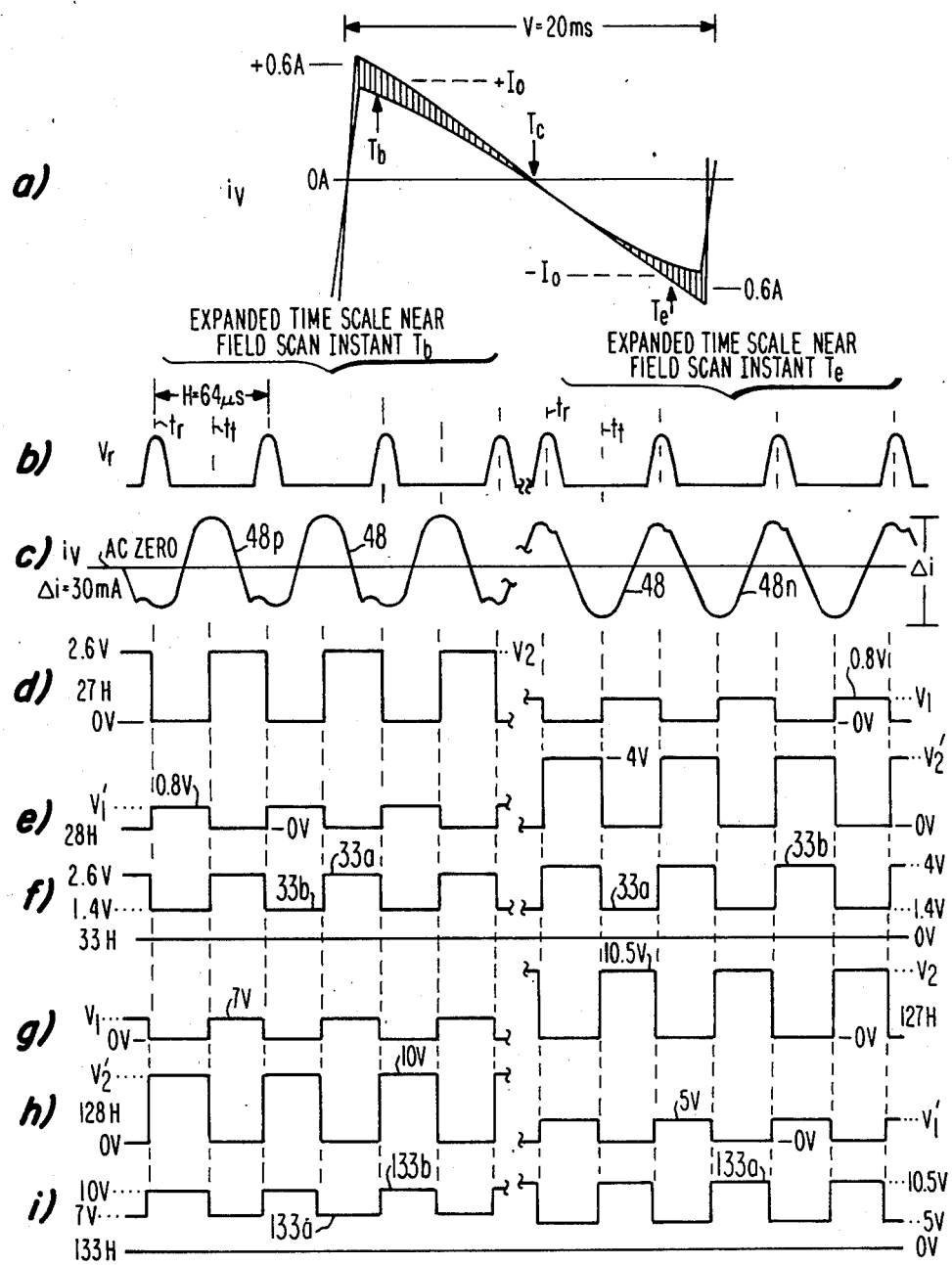

United States Patent [19]

Haferl

[11] Patent Number: 4,668,897
[45] Date of Patent: May 26, 1987

[54] NORTH-SOUTH PINCUSHION CORRECTED DEFLECTION CIRCUIT

[75] Inventor: Peter E. Haferl, Adliswil, Switzerland

[73] Assignee: RCA Corporation, Princeton, N.J.

[21] Appl. No.: 719,227

[22] Filed: Apr. 2, 1985

[30] Foreign Application Priority Data

Apr. 4, 1984 [GB] United Kingdom ............... 8408693
Jun. 12, 1985 [GB] United Kingdom ............... 8414947

[51] Int. Cl.$^4$ .......................................... H01J 29/56
[52] U.S. Cl. ................................. 315/371; 315/403; 315/408
[58] Field of Search ............... 315/371, 370, 399, 403, 315/408

[56] References Cited

U.S. PATENT DOCUMENTS

| | | |
|---|---|---|
| 3,320,469 | 5/1967 | Slavik . |
| 3,452,243 | 6/1969 | Knorr, Jr. . |
| 3,463,961 | 8/1969 | Neal et al. . |
| 3,479,554 | 11/1969 | Kramer . |
| 3,566,181 | 2/1971 | Figlewicz . |
| 3,676,733 | 7/1972 | Eulenberg et al. . |
| 3,697,801 | 10/1972 | Eulenberg ............... 315/371 |
| 3,700,958 | 10/1972 | Haferl ...................... 315/371 |
| 3,721,857 | 3/1973 | Haferl . |
| 3,748,531 | 7/1973 | Boekhorst et al. ..... 315/371 |
| 3,825,793 | 7/1974 | Dietz ........................ 315/371 |
| 3,916,254 | 10/1975 | Worster et al. .......... 315/371 |
| 3,983,450 | 9/1976 | Lehnert .................... 315/370 |
| 3,995,196 | 11/1976 | Lehnert .................... 315/371 |
| 4,041,354 | 8/1977 | Haferl ...................... 315/371 |
| 4,093,895 | 6/1978 | Collette ................... 315/371 |
| 4,101,814 | 7/1978 | Haferl ...................... 315/371 |
| 4,254,365 | 3/1981 | Knight ..................... 315/371 |
| 4,305,023 | 12/1981 | Willis ...................... 315/371 |

FOREIGN PATENT DOCUMENTS

1068307 5/1967 United Kingdom .

OTHER PUBLICATIONS

U.S. patent application Ser. No. 733,661, filed 5/10/85 in the names of P. E. Haferl et al.

Primary Examiner—Theodore M. Blum
Assistant Examiner—David Cain
Attorney, Agent, or Firm—Eugene M. Whitacre; Paul J. Rasmussen; Joseph J. Laks

[57] ABSTRACT

A field deflection amplifier generates a field deflection current in a field deflection winding. An LC resonant circuit is coupled to the deflection winding and to an output switching amplifier. A control circuit switches conductive states of the amplifier at a line rate, with a 50% duty cycle, to excite the LC resonant circuit into providing a line rate correction current for the field deflection winding. The control circuit varies the modulation envelope of the field deflection current at a field rate in a generally sawtooth manner to provide north-south pincushion correction. When used in conjunction with raster scanning in a square-planar picture tube, the modulation envelope is nonlinearly waveshaped to take into account the aspherical nature of the picture tube faceplate.

20 Claims, 11 Drawing Figures

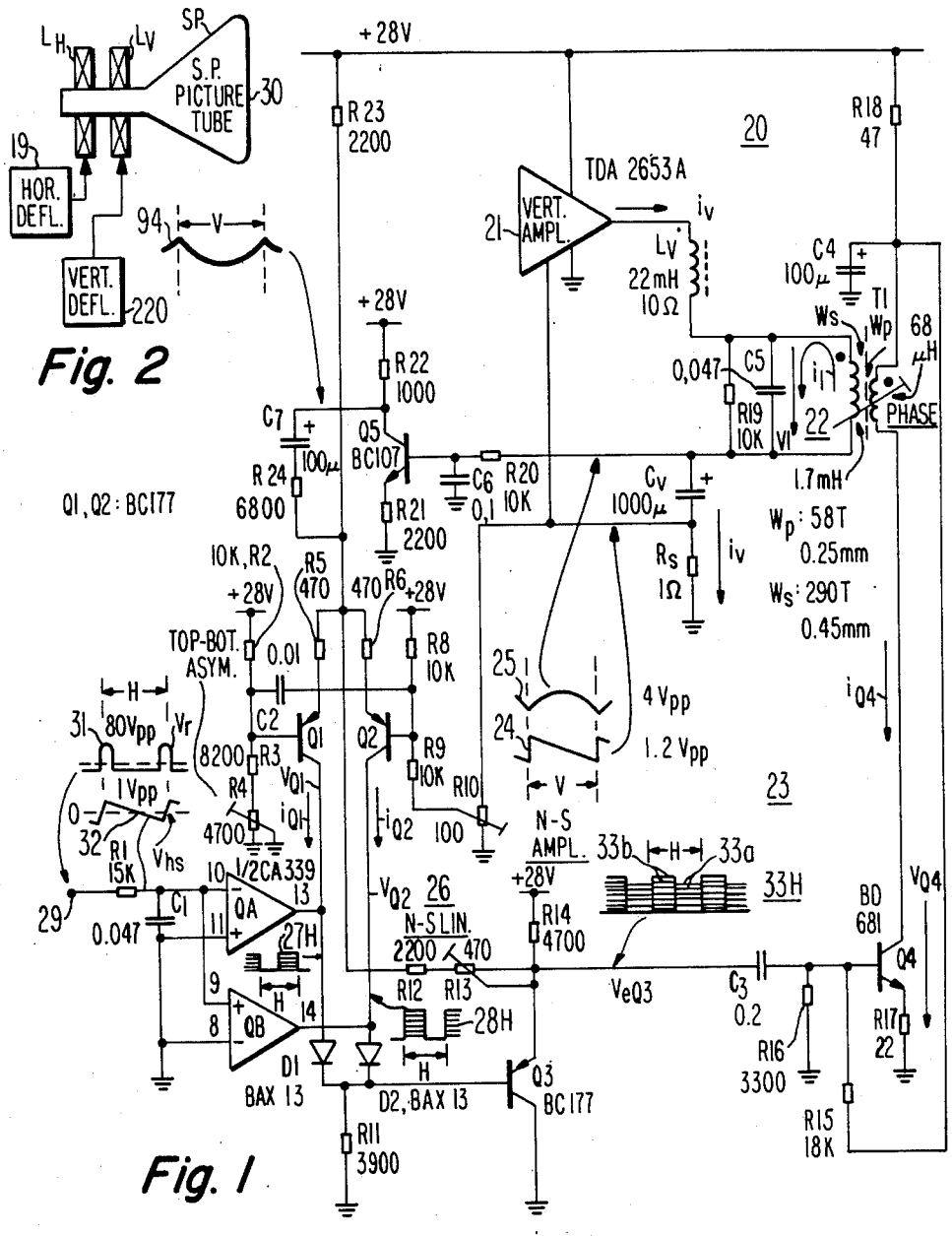

NORTH-SOUTH PINCUSHION CORRECTED DEFLECTION CIRCUIT

This invention relates to north-south pincushion corrected deflection circuits.

Picture tubes for video apparatus such as television receivers or computer monitors may require modulation of the field deflection current for correcting a geometrical distortion known as north-south pincushion distortion. A cause of this distortion is the difference between the beam scanning radius of curvature and the tube faceplate radius of curvature. New, flatter faceplate picture tubes having aspherical faceplate curvatures require a more complex form of north-south pincushion correction than is provided for a conventional spherical faceplate picture tube.

A tube of the type having a complex curvature faceplate is described in the following U.S. patent applications, herein incorporated by reference.

1. U.S. patent application Ser. No. 469,772, filed Feb. 25, 1983, in the name of F. R. Ragland, Jr. and entitled, CATHODE-RAY TUBE HAVING AN IMPROVED SHADOW MASK CONTOUR.

2. U.S. patent application Ser. No. 469,774, filed Feb. 25, 1983 in the name of F. R. Ragland, Jr. and entitled, CATHODE-RAY TUBE HAVING A FACEPLATE PANEL WITH A SUBSTANTIALLY PLANAR PERIPHERY.

3. U.S. patent application Ser. No. 469,775, filed Feb. 25, 1983, in the names of R. J. D'Amato et al., and entitled, CATHODE-RAY TUBE HAVING DIFFERENT CURVATURE ALONG MAJOR AND MINOR AXES.

4. U.S. patent application Ser. No. 529,644, filed Sept. 6, 1983, in the names of R. J. D'Amato et al., and entitled, CATHODE-RAY TUBE HAVING A FACEPLATE PANEL WITH AN ESSENTIALLY PLANAR SCREEN PERIPHERY.

In one form of flatter faceplate picture tube, as typified by the RCA 110° COTY-SP, square-planar, 27V, color television picture tube, A68ACC10X, the formula for the tube faceplate sagittal height, z, in millimeters, with reference to the center of the faceplate is given by:

$$Z = A_1 X^2 + A_2 X^4 + A_3 Y^2 + A_4 X^2 Y^2 + A_5 X^4 Y^2 + A_6 Y^4 + A_7 X^2 Y^4 + A_8 X^4 Y^4,$$

where X and Y are the distance coordinates, in millimeters, from the faceplate center along the major and minor axes, respectively, and where:

$A_1 = -0.236424229 \times 10^{-4}$ $A_2 = -0.363538575 \times 10^{-8}$ $A_3 = -0.422441063 \times 10^{-3}$ $A_4 = -0.213537355 \times 10^{-8}$ $A_5 = +0.883912220 \times 10^{-13}$ $A_6 = -0.100020398 \times 10^{-9}$ $A_7 = +0.117915353 \times 10^{-14}$ $A_8 = +0.527722295 \times 10^{-21}$ The picture tube faceplate defined by this formula has a relatively shallow curvature near the center of the faceplate, which increases near the edges along paths parallel to both the major and minor axes of the tube. The overall result is a faceplate of relatively flat appearance and with planar edges, namely, with points along the top, bottom, right and left edges located substantially in a common plane.

In accordance with a feature of the invention, a north-south pincushion correction circuit, when used in conjunction with a picture tube having an aspherical faceplate produces a vertical rate sawtooth envelope of the horizontal rate modulation of the field deflection current that is nonlinear. The nonlinearity compensates for the faceplate asphericity.

In accordance with another feature of the invention, a north-south pincushion correction circuit has an output stage that may be readily driven by a nonlinear vertical rate sawtooth waveform. A field deflection amplifier generates field deflection current in a field deflection winding. An LC resonant circuit is coupled to the field deflection winding and receives field deflection current therefrom. A switching amplifier is coupled to the LC resonant circuit. A control circuit is responsive to a line rate input signal for switching conductive levels of the switching amplifier at a line rate, thereby exciting the LC resonant circuit at the line rate to produce line rate modulation of the field deflection current. The control circuit is responsive to a field rate input signal for varying the line rate modulation of the field deflection current at the field rate to provide north-south pincushion correction.

The envelope of the line rate modulation reaches zero height within the field trace and retrace intervals. In accordance with still another feature, the time that the envelope reaches zero height during field retrace is advanced to an instant prior to the center of retrace. This assures the attaining of proper envelope height at the beginning of the subsequent field trace interval.

FIG. 1 illustrates a vertical deflection circuit that includes a north-south pincushion correction circuit embodying the invention;

FIG. 2 schematically illustrates a square-planar picture tube and its associated vertical and horizontal deflection windings that advantageously uses a vertical deflection circuit that includes an inventive embodiment of a north-south pincushion correction circuit;

FIG. 3 illustrates a vertical deflection circuit that includes a different north-south pincushion correction circuit in accordance with an aspect of the invention; and FIGS. 4–11 illustrates waveforms useful in explaining operation of the circuits of FIGS. 1 and 3.

In FIG. 1, a vertical deflection circuit 20, includes a vertical deflection amplifier 21 coupled to a vertical deflection winding $L_V$ for generating a vertical deflection current $i_V$ in the deflection winding. Vertical deflection current $i_V$ flows to ground via an LC resonant circuit 22 of a north-south pincushion correction circuit 23 embodying the invention, via a coupling capacitor $C_V$ and via a sampling resistor $R_s$. The vertical rate sawtooth voltage 24 developed by the deflection current $i_V$ in sampling resistor $R_s$ provides negative feedback for vertical deflection amplifier 21.

Current in vertical deflection winding $L_V$ in conjunction with current in horizontal deflection winding $L_H$, both schematically represented in FIG. 2, provide raster scanning of the electron beams across the screen of a square-planar color picture tube SP. As previously discussed, the faceplate 30 of square-planar picture tube SP is aspherical, with the faceplate curvature along both the major and minor axes increasing towards the edges of the faceplate. The overall result is that the surface of the faceplate and thus of the phosphor screen located on the inside surface of the faceplate, is relatively flat, overall, with edges lying substantially in one plane.

Horizontal deflection current is generated in horizontal deflection winding $L_H$ of FIG. 2 by a horizontal deflection circuit 19. Vertical deflection current is generated in vertical deflection winding $L_V$ of FIG. 2 by a vertical deflection circuit 220, that comprises either the inventive circuit 20 of FIG. 1 or the inventive circuit 120 of FIG. 3, to be discussed later.

North-south pincushion distortion of a raster being displayed on the screen of a square-planar picture tube may be corrected, in accordance with an aspect of the invention, by means of a line rate, cosine current which is added to the field deflection current. The cosine correction current, in addition to substantially correcting north-south pincushion geometric error, provides a better fit for a residual, line frequency distortion of the raster, such as gullwing distortion, caused by the nonspherical nature of the faceplate of a square-planar picture tube. Such residual distortion is discussed in British patent application No. 8414946, entitled SUPPRESSED CARRIER MODULATOR and British patent application No. 8414947, entitled N-S RASTER CORRECTION CIRCUIT. The cosine function corrects most of this residual error because of the change in polarity of slope of the cosine current at each zero crossing. A parabolically shaped line rate correction is less beneficial than a cosinusoidally shaped correction because of the presence of gullwing distortion.

To generate a line rate cosine correction current component in field deflection current $i_V$, LC resonant circuit 22 of FIG. 1 is excited at a line rate by a switching amplifier, Darlington transistor Q4. LC resonant circuit 22 is tuned to the horizontal deflection frequency. A line rate cosinusoidal circulating current $i_1$ is thereby generated in resonant circuit 22. A control circuit 26 develops a control signal 33H that switches conductive levels of amplifier Q4 at a line rate. In accordance with an inventive aspect, the switching occurs with a substantially 50% duty cycle. The 50% duty cycle of control signal 33H is advantageous when exciting LC resonant circuit 22 at its natural frequency $f_H$. Because the strongest frequency component of the 50% duty cycle signal is the fundamental frequency, $f_H$, little harmonic distortion is introduced into the excitation of LC resonant circuit 22.

To provide proper north-south pincushion correction, the amplitude of the horizontal rate modulation of the vertical deflection current is made to vary at a vertical rate in a sawtooth manner. In accordance with another inventive aspect, control circuit 26 switches conductive levels of switching amplifier Q4 at a line rate between first and second levels of conduction. To produce a vertical rate variation of the amplitude of cosine correction current $i_1$, the magnitudes of the two conduction levels are varied at a vertical rate in a sawtooth manner. In this way, the envelope of the line rate modulation of the vertical deflection current $i_V$ is of maximum height at the top and bottom of the raster and minimum at the center, thereby providing the proper amount of north-south pincushion correction at all times during vertical scan.

Control circuit 26 includes first and second control amplifiers Q1 and Q2, differentially connected, for generating first and second control currents $i_{Q1}$ and $i_{Q2}$ at the respective collector outputs of transistors Q1 and Q2. The collector outputs of control amplifiers Q1 and Q2 are switched to ground at a line rate by respective first and second control switches, QA and QB.

To produce the line rate switching of control switches QA and QB, a horizontal retrace pulse voltage 31, identified as the voltage $V_r$ in FIG. 4a, is conventionally developed at an input terminal 29. Horizontal retrace pulse voltage 31 is integrated by a resistor $R_1$ and a capacitor $C_1$ into a horizontal sawtooth voltage 32, identified as the voltage $V_{hs}$ in FIG. 4b. Horizontal sawtooth voltage 32 is applied to the inverting input terminal of switch QA and to the noninverting input terminal of switch QB. The other input terminals of switches QA and QB are grounded.

As illustrated in FIGS. 4c and 4d by switching voltages 27H and 28H, the outputs of control switches QA and QB are switched between conductive and nonconductive states at a line rate in phase opposition to each other. Thus, during the interval $t_2$ through $t_4$, switch QA is in saturated conduction and switching voltage 27H is at ground potential. During this interval, control switch QB is cutoff and switching voltage 28H is at the voltage level of the collector of control amplifier Q2. During the next half horizontal cycle, between time $t_4$ and time $t_6$, control switch QA is cutoff and control switch QB is in saturated conduction. Switching voltage 28H is at ground potential and switching voltage 27H is at the voltage level of the collector of control amplifier Q1.

The line rate, switching voltages 27H and 28H are superimposed at the base of a driver transistor Q3 via diodes $D_1$ and $D_2$. Transistor Q3 is arranged in an emitter-follower configuration. The emitter output electrode of driver transistor Q3 is AC coupled to the base of power switching amplifier Q4 via a capacitor $C_3$. In carrying out an aspect of the invention, transistor Q4 may be operated in the linear mode. DC bias for the base of transistor Q4 is provided by voltage dividing resistors R15 and R16. Emitter degeneration is provided by a resistor $R_{17}$.

The superposition of line rate voltages 27H and 28H at the base of driver transistor Q3 produces a bilevel, line rate control voltage 33H at the output emitter electrode of transistor Q3 having first and second voltage levels 33a and 33b as illustrated in FIG. 4e. Voltage level 33a is directly related to the amplitude of switching voltage 27H. Voltage level 33b is directly related to the amplitude of switching voltage 28H.

Bilevel control signal 33H switches conductive levels of output switching amplifier Q4 at a line rate between first and second levels of conduction. As illustrated in FIG. 4f, the collector current $i_{Q4}$ of transistor Q4 is a bilevel current having a first current level 34a that is directly related to the magnitude of level 33a of control signal 33H and having a second current level 34b that is directly related to the magnitude of level 33b.

Line rate output current $i_{Q4}$ excites LC resonant circuit 22 into a substantially cosinusoidal oscillation. The capacitive branch of resonant circuit 22 comprises a capacitor $C_5$ coupled across the secondary winding $W_s$ of an adjustable transformer T1. Transformer T1 comprises the inductive branch of resonant circuit 22. The primary winding $W_p$ of transformer T1 is coupled to the collector output electrode of switching amplifier Q4. Transformer T1 is tuned to resonate at the horizontal deflection frequency. Resonant circuit 22, therefore, filters out harmonics of the line rate, bilevel exciting current signal $i_{Q4}$ to generate a generally sinusoidal voltage across primary winding $W_p$, at the line rate. This sinusoidal voltage is illustrated in FIG. 4g by the collector voltage $V_{Q4}$ of switching amplifier $Q_4$.

The excitation of resonant circuit 22 generates a cosinusoidal oscillation of current and a sinusoidal oscillation voltage in capacitor $C_5$ and secondary winding $W_s$. FIGS. 5b and 5c illustrate the cosinusoidal correction current $i_1$ in secondary winding $W_s$ and the 90° phase-shifted voltage V1 across resonant tank circuit 22. FIG. 5a illustrates a reference horizontal retrace pulse voltage. For descriptive purposes, an oscillatory waveform is considered cosinusoidal when the maxima or minima occur at the center of horizontal trace or retrace and is considered sinusoidal when zero at those instants.

Voltage V1 generates in vertical deflection winding $L_V$ a cosinusoidal correction current component to correct north-south pincusion error. This component is phased by correction current $i_1$ of LC resonant circuit 22 and has an amplitude of $i_1 \times L_{Ws}/L_V$, where $L_{Ws}$ is the inductance of the secondary winding $W_s$ of transformer T1. The correction current component of vertical deflection current $i_V$ provides a line rate modulation which adds to the vertical deflection current at the center of each line scan and which subtracts at the beginning and end of each line scan.

Vertical deflection winding $L_V$ is AC-wise parallel connected to resonant circuit 22 and participates in the resonance. The horizontal rate currents are therefore in-phase. The coupling between windings $W_p$ and $W_s$ of transformer T1 should be very tight to avoid phase shifts between windings $W_p$ and $W_s$. Transistor $Q_4$ operates in class A and represents a current source which does not load resonant circuit 22. Winding $W_p$ represents to transistor $Q_4$ a high load impedance at the resonance frequency of resonant circuit 22. At all other frequencies, the impedance of winding $W_p$ is low. Harmonics of the line frequency are therefore short-circuited by winding $W_p$.

The inductance of transformer T1 is adjustable for controlling the phase of the line rate modulation of the field deflection current to avoid north-south trapeze distortion. For correct phasing of the line rate modulation, as will be explained later, it is also advantageous that the switching of control signal 33H between levels 33a and 33b occurs at the center of horizontal retrace, at time $t_2$ of FIGS. 4a–4g and at the center of horizontal trace, at time $t_4$.

To provide north-south pincushion correction, the amplitude of the cosinusoidal, line rate modulation of the vertical deflection current is varied at a vertical rate in a generally sawtooth manner. As illustrated in FIG. 6a, the envelope height of the amplitude modulation envelope of vertical deflection current $i_V$ is maximum at the top and bottom of the raster, at the beginning and end of field scan, and is zero at the center of the raster or field scan. The closely spaced vertical lines in the waveform of FIG. 6a schematically represent the line rate modulation of the vertical deflection current.

In accordance with an inventive aspect, to provide the vertical rate variation of the envelope of the line rate modulation of vertical deflection current $i_V$, control circuit 26 varies both level $33_a$ and level $33_b$ of control signal 33H at a field rate. In accordance with another inventive aspect, level 33a varies in a sense opposite that of level 33b during field scan, such that, for example, level 33a decreases in magnitude during field scan whereas level 33b increases. Additionally, by means of such an arrangement, the phase of the cosinusoidal correction of the vertical deflection current during the second half of vertical scan is phase-shifted by 180 degrees from the cosinusoidal correction provided during the first half of vertical scan.

To develop a vertical rate variation of the amplitude levels of control signal 33H, vertical sawtooth voltage 24, developed across sampling resistor $R_s$, is applied to the base of control amplifier $Q_2$ of differentially connected control amplifiers $Q_1$ and $Q_2$. The magnitude of control current $i_{Q2}$, the collector current of transistor $Q_2$, is not constant but varies at a vertical rate, increasing in a generally sawtooth manner during field scan. Control current $i_{Q1}$, the collector current of transistor $Q_1$, is also a vertical rate varying current but decreases in magnitude during field scan. Due to the vertical rate variation of control currents $i_{Q1}$ and $i_{Q2}$, the amplitudes of switching voltages 27H and 28H also vary at a vertical rate, with the amplitude of switching voltage 27H decreasing during field scan and the amplitude of switching voltage 28H increasing during field scan.

FIGS. 6b through 6i illustrate various waveforms at an expanded time scale near symmetrically located field scan instants $T_b$ and $T_e$ of FIG. 6a. Field scan instants $T_b$ and $T_e$ are equally spaced from instant $T_c$, the center of field scan. Thus, disregarding the line rate modulation, vertical deflection current $i_V$ of FIG. 6a has the same magnitude $I_0$, but opposite sign, at field scan instants $T_b$ and $T_e$.

Line rate switching voltage 27H of FIG. 6d is phased to provide a positive going transition at the center of horizontal trace, at time $t_t$ of horizontal retrace pulse voltage $V_r$ of FIG. 6b and to provide a negative going transition at the center of horizontal retrace at time $t_r$. Voltage 27H maintains the same phase throughout field scan, including instants $T_b$ and $T_e$. The amplitude of voltage 27H, however, decreases at a vertical rate in a sawtooth manner, from a voltage level $V_2$, near field scan instant $T_b$, to a voltage level $V_1$, near field scan instant $T_e$.

Line rate switching voltage 28H of FIG. 6e is phased opposite that of voltage 27H, to provide a negative going transition at the center of horizontal trace, at time $t_t$ and to provide a positive going transition at the center of horizontal retrace, at time $t_r$. Voltage 28H maintains the same phase relationship throughout field scan, including instants $T_b$ and $T_e$. The amplitude of voltage 28H increases at a vertical rate in a sawtooth manner, from the voltage level $V'_1$, near field scan instant $T_b$, to the voltage level $V'_2$, near field scan instant $T_e$.

Line rate control voltage 33H, illustrated in FIG. 6f, equals the superposition of voltages 27H and 28H. During the first half of field scan, the amplitude of voltage 27H predominates, and the phase of control voltage 33H equals the phase of voltage 27H, with a positive going transition occurring at the center of horizontal trace. At some point, near the center of field scan, the amplitudes of voltages 27H and 28H are equal and control voltage 33H contains no square wave component. During the second half of field scan, the amplitude of voltage 28H predominates, and the phase of control voltage 33H switches by 180° to become equal to the phase of voltage 28H, with a negative going transition occurring at the center of horizontal trace.

The phase reversal of control voltage 33H from the first half of field scan to the second half of field scan produces the required phase reversal of the line rate, cosinusoidal correction current component 48 of vertical deflection current $i_V$, illustrated in FIG. 6c. During the first half of field scan, such as near field scan instant $T_b$, control voltage 33H of FIG. 6f has a positive going transition at time $t_t$, the center of horizontal trace, thereby producing a positive amplitude correction current component 48p of FIG. 6c. During the second half of field scan, such as near field scan instant $T_e$, control voltage 33H has a negative going transition at time $t_t$, thereby producing a negative amplitude correction current component 48n.

FIG. 7a illustrates voltage $V_{Q1}$ at the collector of control amplifier $Q_1$ in an vertical rate time scale. The line rate modulation of collector voltage $V_{Q1}$ is schematically indicated by the closely spaced vertical lines. FIG. 7b illustrates voltage $V_{Q2}$ at the collector of amplifier transistor $Q_2$. The line rate modulation of collector voltage $V_{Q2}$ is schematically indicated by the closely spaced vertical lines. A comparison of FIGS. 7a and 7b reveals that the vertical rate variation of voltage $V_{Q1}$ is in an opposite sense to that of the vertical rate variation of the voltage $V_{Q2}$.

Figure 7:
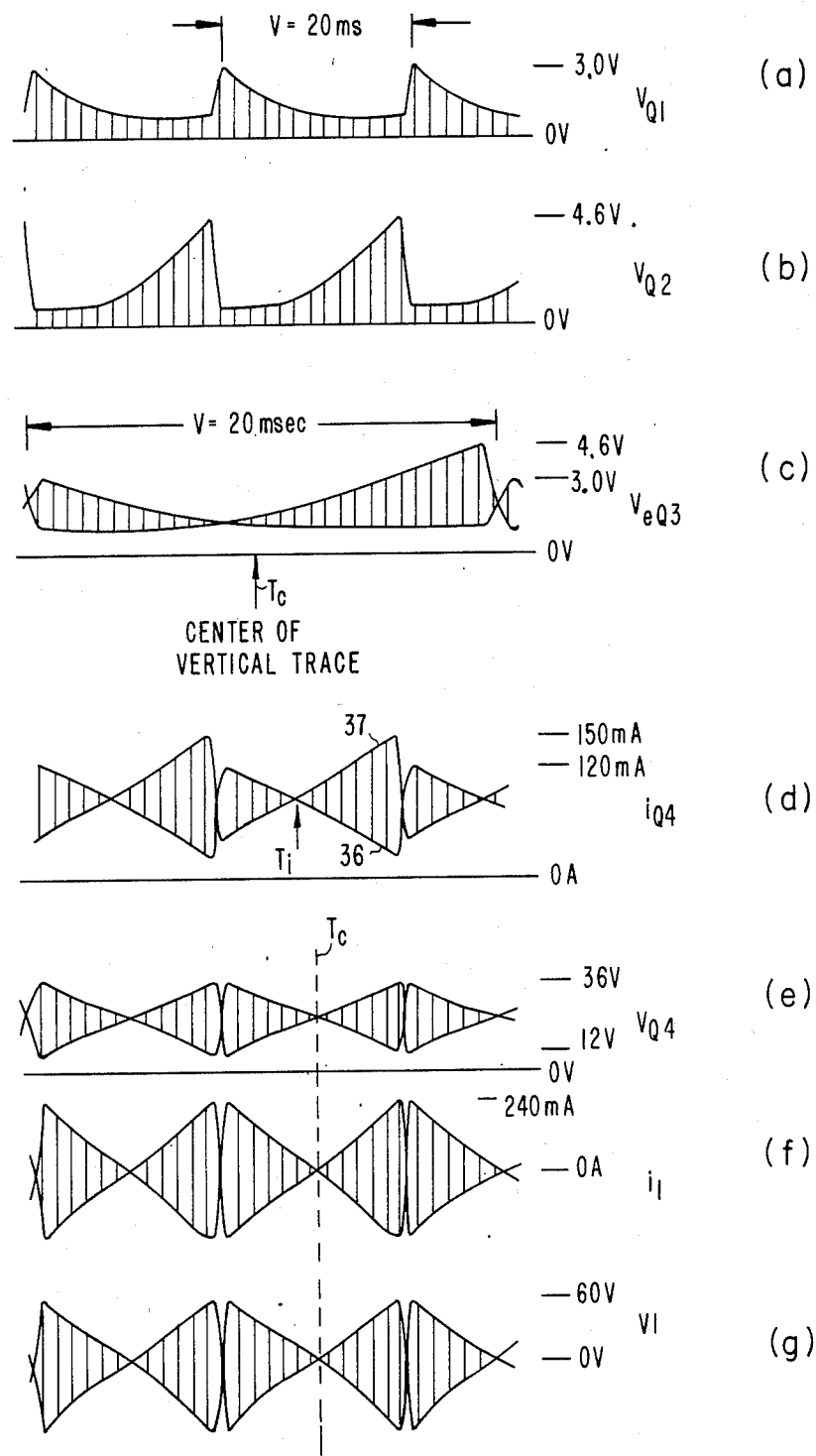

FIG. 7c illustrates voltage $V_{eQ3}$ at the emitter output of driver transistor $Q_3$, at an expanded time scale relative to the time scale of the other waveforms of FIG. 7. Voltage $V_{eQ3}$, as represented in FIG. 7c, corresponds to the vertical rate modulation envelope of control signal 33H. The line rate modulation of voltage $V_{eQ3}$ is schematically indicated in FIG. 7c by the closely spaced vertical lines.

The vertical rate varying control voltage $V_{eQ3}$ is applied to the base of switching amplifier $Q_4$ to vary at a vertical rate the amplitude of exciting current $i_{Q4}$. As illustrated in FIG. 7d, the envelope of current $i_{Q4}$ may be represented by two generally sawtooth lines 36 and 37 varying at a field rate in opposing senses. The amplitude of the line rate component of current $i_{Q4}$, schematically indicated by the closely spaced vertical lines, decreases in a generally sawtooth manner from the beginning of field scan to the center of field scan and increases in a generally sawtooth manner from the center of field scan to the end of field scan.

The vertical rate envelope of collector voltage $V_{Q4}$ is illustrated in FIG. 7e and is generally of the same waveshape as that of the collector current $i_{Q4}$ of FIG. 7d. The crossover point $T_c$ of the voltage envelope of FIG. 7e occurs approximately at the center of vertical trace. Time $T_c$ is delayed from the crossover point $T_i$ of the current envelope of FIG. 7d because of crosstalk between horizontal deflection winding $L_H$ and vertical deflection winding $L_V$, to be described later.

The vertical rate modulation of the conduction of switching amplifier $Q_4$ produces a vertical rate modulation of correction current $i_1$ in LC resonant circuit 22 and produces a vertical rate modulation of the amplitude of the oscillatory voltage V1, as illustrated in FIGS. 7f and 7g, respectively. The line rate components of current $i_1$ and voltage V1 are schematically indicated in FIG. 7f and 7g by the closely spaced vertical lines. The effect of the vertical rate modulation of current $i_1$ and voltage V1 on vertical deflection current $i_V$ is illustrated in FIG. 6a wherein the envelope of the line rate modulated vertical deflection current produces maximum line rate modulation at the top and bottom of vertical scan and no modulation at the center of vertical scan.

Some crosstalk exists between horizontal deflection winding $L_H$ and vertical deflection winding $L_V$ of FIG. 2. This crosstalk is in the form of an induced voltage and an induced current in vertical deflection winding $L_V$ due to the electromagnetic coupling of the fields produced by the horizontal deflection current. The horizontal rate crosstalk current induced in vertical deflection winding $L_V$ excites resonant circuit 22 and adds to vertical deflection current $i_V$ a north-south pincushion correction waveform of one polarity only and of constant amplitude. The polarity is such as to add to the north-south correction provided by pincushion correction circuit 23 at the top of the raster and subtract from the correction provided at the bottom of the raster.

To compensate for the asymmetrical horizontal crosstalk, in accordance with a feature of the invention, pincushion correction circuit 23 generates asymmetrical vertical rate envelopes to voltage $V_{eQ3}$ and current $i_{Q4}$ of FIGS. 7c and 7d. The asymmetrical envelope of current $i_{Q4}$ compensates the crosstalk to obtain symmetrical envelopes for voltage $V_{Q4}$, current $i_1$ and voltage V1 of FIGS. 7e, 7f and 7g. The amount of asymmetry introduced is controlled by adjusting potentiometer $R_4$ of the voltage dividing network coupled to the base of differentially connected amplifier $Q_1$. The particular deflection yoke-picture tube combination and yoke mounting location may also require asymmetric correction. A slight asymmetric correction may also be desirable when the viewing axis is different from the picture tube axis.

Current $i_{Q4}$ of FIG. 7d is proportional to the drive voltage $V_{eQ3}$ of FIG. 7c. The envelope of voltage $V_{Q4}$, which is AC-wise also developed across winding $W_p$ of transformer T1, is the transformed voltage V1. Voltage V1 is proportional to the total drive of resonant circuit 22 consisting of current $i_{Q4}$ and the horizontal crosstalk. The delay between time $T_i$ and $T_c$ is therefore a function of the amount of horizontal crosstalk. The advance of time $T_i$ is adjusted by potentiometer $R_4$ to obtain straight lines at the center of vertical trace, around time $T_c$.

The horizontal rate pickup in vertical deflection winding $L_V$ introduces a discontinuity in the line rate modulation of vertical deflection current $i_V$ during horizontal retrace. As illustrated in FIG. 6c, during horizontal retrace, the modulation of the vertical deflection current $i_V$ changes from the line rate $f_H$ to the higher horizontal retrace frequency. This discontinuity, occurring during horizontal retrace, has little visible effect.

As previously mentioned, the faceplate of a square-planar picture tube is aspherical. Its curvature is relatively shallow near the center of the faceplate and increases near the edges along paths parallel to both the major and minor axis. The edges of the faceplate are nearly planar, with points along the top, bottom, right and left edges substantially located in a common plane. In accordance with an inventive aspect, north-south pincushion correction circuit 23 of FIG. 1 produces a nonlinear vertical rate sawtooth envelope of the horizontal rate modulation of the field deflection current. The nonlinear waveshaping of the modulation envelope corrects for residual north-south pincushion distortion caused by the asphericity of the faceplate of square-planar picture tube SP of FIG. 2.

Figure 8:
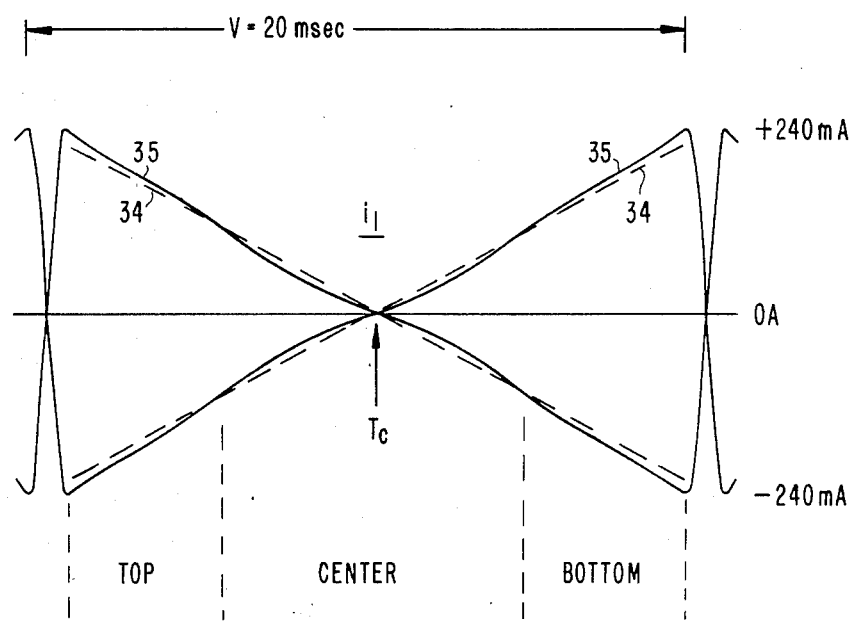
Figure 9:
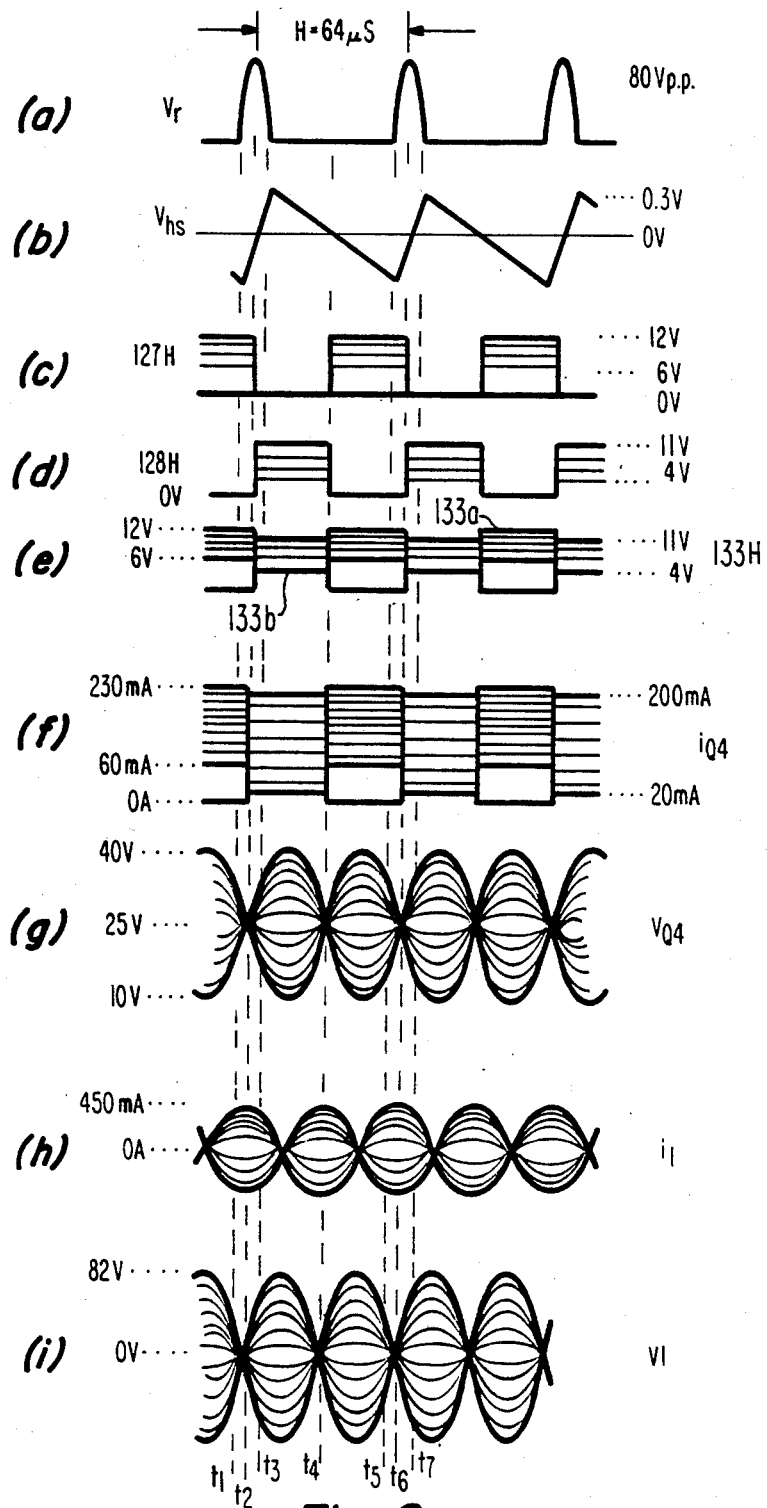

To understand the need for nonlinearly waveshaping the vertical rate envelope of the line-rate modulation of vertical deflection current $i_V$, assume, in a hypothetical example, that the vertical rate modulation of correction current $i_1$, produced a linear sawtooth envelope, as illustrated by the dashed line envelope waveform 34 of FIG. 8.

For an SP tube faceplate, however, a linear envelope 34 is unable to apply the proper amounts of line rate amplitude correction at all points during field scan. Assume, in the hypothetical example, that the north-south pincushion amplitude potentiometer $R_{10}$ is adjusted to provide the proper amount of correction amplitude for raster lines scanned intermediate the center line and the top or bottom edge. The result is that for a linear sawtooth envelope, too much correction amplitude is provided around the center of the raster and too little correction is provided at the top or bottom of the raster. Analogous situations hold true when potentiometer $R_{10}$ is adjusted to provide proper correction amplitude at either the top and bottom or in the center.

In accordance with an aspect of the invention, north-south pincushion correction circuit 23 provides a nonlinear waveshaping of the vertical rate sawtooth envelope to take into account the aspherical nature of the faceplate of a square-planar picture tube. In the example previously described, a linear vertical rate modulation produces too much correction amplitude around the center and too little correction at the top or bottom of the raster. For this example, proper nonlinear waveshaping is one that compresses slightly the envelope height at the smaller correction current amplitudes when scanning of the center lines of the raster and expands slightly the envelope height at the larger correction current amplitudes when scanning the top and bottom lines of the raster.

To provide the nonlinear waveshaping, the vertical rate envelope of control voltage $V_{eQ3}$, illustrated in FIG. 7c, is nonlinearly waveshaped to become compressed at small amplitude levels of modulation and to become expanded at the large amplitude levels. To produce the nonlinear waveshaping of the envelope of control voltage $V_{eQ3}$, a positive feedback of voltage $V_{eQ3}$ to the emitters of control transistors $Q_1$ and $Q_2$ is provided via potentiometer $R_{13}$ and resistor $R_{12}$. The positive feedback nonlinearly waveshapes control currents $i_{Q1}$ and $i_{Q2}$ generated by control amplifiers $Q_1$ and $Q_2$, thereby nonlinearly varying each of the bilevel amplitudes of control signal 33H.

Additional nonlinear waveshaping is provided by superimposing, at the emitter electrodes of control amplifiers $Q_1$ and $Q_2$, a parabolic voltage 94 developed at the collector of a transistor $Q_5$. Parabolic voltage 94 is AC coupled to control amplifiers $Q_1$ and $Q_2$ via a capacitor $C_7$ and a resistor $R_{24}$. To develop parabolic voltage 94, the parabolic voltage 25 developed at the top plate of coupling capacitor $C_V$ is applied to the base of transistor $Q_5$.

By means of the positive feedback of control voltage $V_{eQ3}$ and the superposition of parabolic voltage 94, the vertical rate envelope of voltage $V_{eQ3}$ is nonlinearly waveshaped in a manner that produces a nonlinear envelope to correction current $i_1$, as illustrated by the solid line envelope 35 of FIG. 8. Compared to the linear sawtooth envelope 34, envelope 35 is compressed in height at the center of raster scan and expanded at the top and bottom of raster scan, as is required, given the conditions imposed by the hypothetical example. Given a different set of conditions, such as may occur at different settings of potentiomete $R_{10}$, the nonlinear waveshaping may require corresponding modification. It should be noted, that for explanatory purposes, the nonlinearity of envelope 35 of FIG. 8 has been emphasized to a slight degree.

FIG. 3 illustrates a vertical deflection circuit 120 that includes a different north-south pincushion distortion correction circuit 123, embodying the invention. In FIG. 3, vertical deflection amplifier 21 generates an output voltage 21V, illustrated in FIG. 10h. Output voltage 21V is applied to vertical deflection winding $L_V$, to generate a vertical deflection current $i_V$, illustrated in FIG. 10i.

To generate the line rate modulation of vertical deflection current $i_V$ that provides north-south pincushion correction, the output stage of pincushion correction circuit 123 includes a driver transistor $Q_3$, a switching amplifier $Q_4$ and an LC resonant circuit 22. Each of these elements performs its respective function in a manner identical to the corresponding element in pincushion correction circuit 23 of FIG. 1. A control circuit 126 develops the amplitude modulated, line rate, bilevel control voltage 133H that drives switching amplifier $Q_4$.

In control circuit 126, a horizontal retrace pulse voltage 31, developed at a terminal 29 and illustrated in FIG. 9a, is integrated by capacitor $C_{15}$ and resistor $R_{42}$ and $R_{54}$ to generate a line rate sawtooth voltage 32, illustrated in FIG. 9b, that is applied to the inverting input terminal of a controllable switch U2A. At the output of switch U2A, there is developed a line rate, 50% duty cycle, switching voltage 127H, illustrated in FIG. 9c. Line rate sawtooth voltage 32 is also applied to the noninverting input terminal of a controllable switch U2C to generate at the switch output a line rate, 50% duty cycle, switching voltage 128H, illustrated in FIG. 9d, that is phase shifted by 180° from switching voltage 127H.

Switching voltages 127H and 128H are superimposed via diodes D1 and D2 at the base of emitter-follower driver transistor $Q_3$ to generate, at the emitter electrode, a line rate, bilevel control voltage 133H, illustrated in FIG. 9e. The amplitude level 133a of control voltage 133H is directly related to the amplitude of switching voltage 127H, whereas amplitude level 133b is directly related to the amplitude of switching voltage 128H.

To provide the proper amount of north-south pincushion correction, control circuit 126 varies both levels 133a and 133b at a vertical rate in a generally sawtooth manner. The vertical sawtooth sampling voltage 24 is divided in voltage by a potentiometer $R_1$ and AC coupled via a capacitor $C_9$ to the inverting input terminal of a control amplifier U1C to develop a positive going, field rate sawtooth control voltage $V_C$ at the amplifier output. Control voltage $V_C$ is applied to the inverting input terminal of a control amplifier U1D to develop at the amplifier output a negative going, field rate sawtooth voltage $V_D$.

Field rate sawtooth voltages $V_C$ and $V_D$ are applied via resistor $R_{40}$ and $R_{41}$ to the outputs of control switches U2A and U2C, respectively. The amplitudes of switching voltages 127H and 128H therefore vary at a field rate in a sawtooth manner in accordance with the amplitudes of control voltages $V_C$ and $V_D$, respectively.

Figure 10:
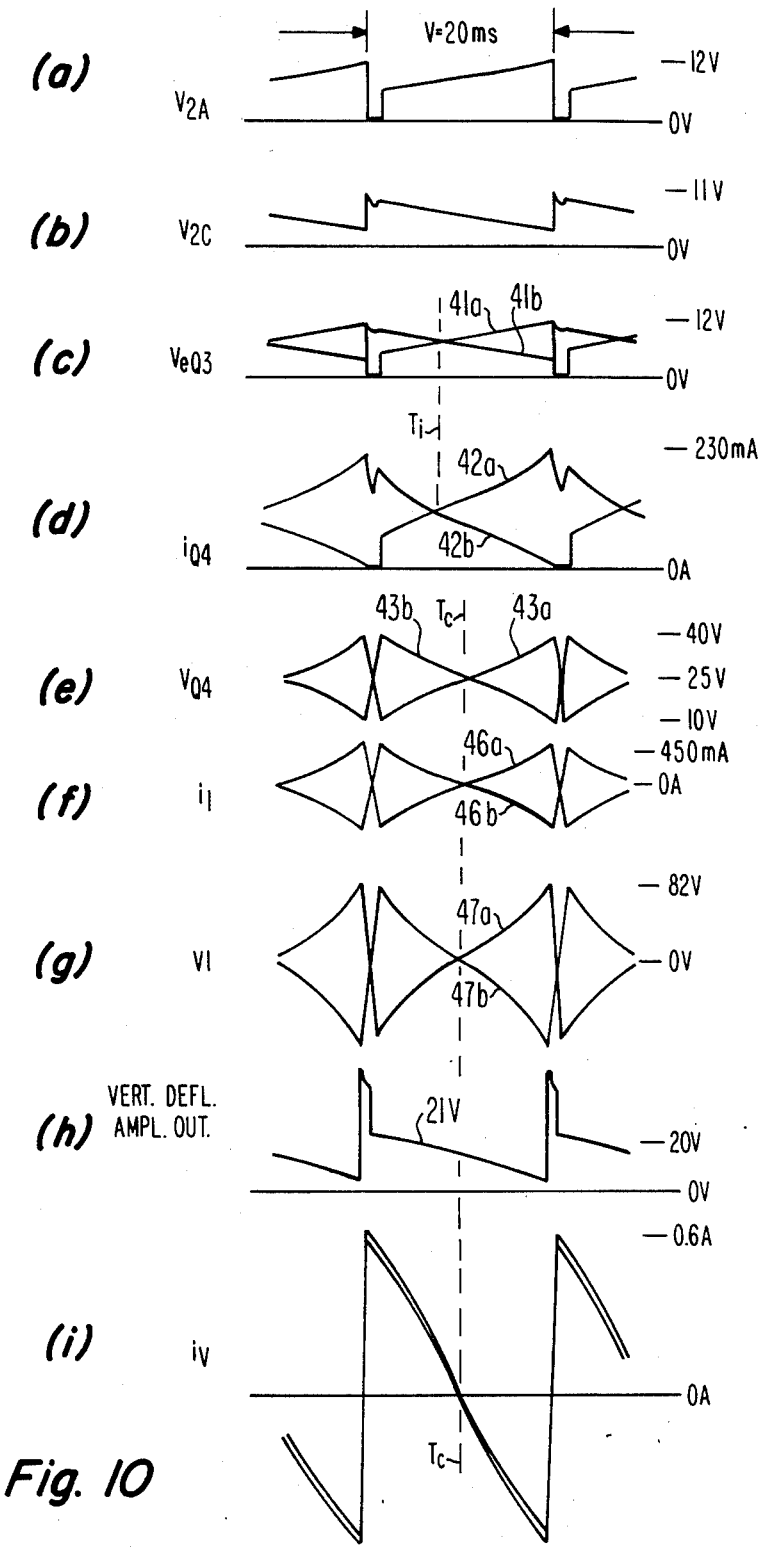

FIG. 10 illustrates various waveforms of the circuit of FIG. 3 at a vertical rate time scale, with the line rate modulation of the waveforms being omitted from illustration. As illustrated in FIG. 10a, voltage $V_{24}$, at the output of control switch U2A, is a positive going, vertical rate sawtooth voltage, representing the vertical rate modulation envelope of switching voltage 127H. Similarly, as illustrated in FIG. 10b, control voltage $V_{2C}$, developed at the output of control switch U2C, is a negative going, vertical rate sawtooth voltage, representing the vertical rate modulation envelope of switching voltage 128H.

The vertical rate modulation of the amplitudes of line rate switching voltages 127H and 128H produces a vertical rate modulation of each of the levels 133a and 133b of control voltage 133H, with amplitude level 133a increasing in amplitude during field scan and amplitude 133b decreasing. As illustrated FIG. 10c, control voltage $V_{eQ3}$, developed at the emitter of driver transistor $Q_3$, represents the vertical rate modulation envelope of the switched, line rate control voltage 133H.

Line rate control voltage 133H produces the excitation current $i_{Q4}$ for LC resonant circuit 22. FIG. 9f illustrates excitation current $i_{Q4}$ at a line rate time scale, and FIG. 10d illustrates t current at a field rate time scale. The oscillatory voltage $V_{Q4}$, developed at the collector of switching amplifier $Q_4$, is illustrated at a line rate time scale in FIG. 9g and at a field rate time scale in FIG. 10e. The vertical rate envelope 42a and 42b of current $i_{Q4}$ in FIG. 10d follows closely the waveshape of the vertical rate envelope 41a and 41b of control voltage $V_{eQ3}$ in FIG. 10c.

The envelope waveforms of FIGS. 10e, 10f and 10g follow the sum of the envelope of current $i_{Q4}$ of FIG. 10d and the envelope of the line rate crosstalk. As previously explained, this results in a delay of the crossover points in the waveforms of FIGS. 10e, 10f and 10g. To compensate for the delay and locate the crossover points at the center of vertical trace, at time $T_c$, the crossover points of the envelopes of the waveforms of FIGS. 7c and 7d are advanced to time $T_i$, prior to time $T_c$. The amount of advance is adjusted by potentiometer $R_{37}$.

Excitation current $i_{Q4}$ excites LC resonant circuit 22 into oscillation to generate a line rate correction current $i_1$, illustrated in FIG. 9h and a line rate correction voltage V1 illustrated in FIG. 9i. Voltage V1 is applied to vertical deflection winding $L_V$ for providing north-south pincushion correction. The vertical rate modulation envelope 46a and 46b of correction current $i_1$ and the vertical rate modulation envelope 47a and 47b of correction voltage V1 are illustrated in FIGS. 10f and 10g, respectively.

Line rate switching voltages 127H and 128H have the same phase relationships with horizontal retrace pulse voltage 31 as do the corresponding line rate switching voltages 27H and 28H of north-south pincushion correction circuit 23 of FIG. 1. As illustrated in FIGS. 6d and 6g, the positive going transitions of switching voltages 27H and 127H occur at time $t_t$, the center of the horizontal trace interval, and, as illustrated in FIGS. 6e and 6h, the positive going transitions of switching voltages 28H and 128H occur at time $t_r$, the center of the horizontal retrace interval.

Switching voltages 127H and 128H differ from switching voltages 27H and 28H in the direction taken by their respective vertical rate amplitude modulation from the beginning of field scan to the end of field scan. Comparing FIG. 10a with FIG. 7a and comparing FIG. 6g with FIG. 6d, one notes that the amplitude of switching voltage 127H increases during field scan, whereas the amplitude of switching voltage 27H decreases. Similarly, by comparing the appropriate figures, one notes that the amplitude of switching voltage 128H decreases during field scan, whereas the amplitude of switching voltage 28H increases.

Because the amplitude modulation of switching voltages 127H and 128H is opposite the amplitude modulation of switching voltages 27H and 28H, line rate control voltage 133H of FIG. 6i is phase shifted by 180° from line rate control voltage 33H of FIG. 6f. This phase difference must be taken into account in order to produce a positive going amplitude modulation of deflection current $i_V$ during the first half of vertical scan, prior to time $T_c$ of FIG. 6a, and a negative going amplitude modulation during the second half of vertical scan, after time $T_c$. One way of taking into account the 180° out-of-phase relationship between control voltage 133H and control voltage 33H is to reverse the winding direction of primary winding $W_p$ in transformer T1 of FIG. 3 from the direction of primary winding $W_p$ of FIG. 1.

In accordance with another feature of the invention, the nonlinear waveshaping of the vertical rate modulation envelope of the cosinusoidal correction of vertical deflection current $i_V$ is produced by the vertical waveshaping circuit 138 of FIG. 3. Vertical sawtooth voltage 24, developed across north-south amplitude control potentiometer $R_1$, represents sampled vertical deflection current. As such, the waveform of sawtooth voltage 24 is S-shaped, having a slope at the beginning and end of field scan that is shallower than at the center of field scan. The required slope for the nonlinearly waveshaped vertical rate modulation envelope of deflection current $i_V$, as explained previously, is a slope that is steeper at the beginning and end of field scan than at the center. Nonlinear waveshaping circuit 138 develops from vertical sawtooth voltage 24 a modified, waveshaped vertical rate voltage 45. The addition of vertical rate voltage 45 to vertical sawtooth voltage 24 at the inverting input terminal of amplifier U1C results in the correct waveform slopes to voltages $V_c$ and $V_d$ for providing north-south pincushion correction in a square-planar picture tube.

In waveshaping circuit 138, vertical sawtooth voltage 24 is applied to the inverting input terminal of an operational amplifier U1A. Operational amplifier U1A functions as a double integrator to produce at the amplifier output a vertical rate, third-order, S-shaped waveform 44. The AC zero-crossing of waveform 44 is slightly advanced relative to the center of field scan. Waveform 44 is first delayed by a resistor $R_5$ and a capacitor $C_3$ and then applied to the inverting input terminal of an operational amplifier U1B. Operational amplifier U1B functions as an inverting amplifier to generate at its output an envelope modifying voltage 45 having an AC zero-crossing at the center of field scan.

Envelope modifying voltage 45 is combined with sawtooth voltage 24 at the inverting input terminal of control amplifier U1C to produce a nonlinear waveshape to the vertical rate envelope control voltages $V_C$ and $V_D$. As a result, the vertical rate sawtooth envelopes of the waveforms in FIGS. 10a and 10b are waveshaped to produce an envelope of the line rate correction that has a steeper slope at the beginning and end of field scan than it would otherwise have had and a shallower slope at the center of field scan. Proper north-south pincushion correction in a square-planar picture tube is thereby achieved.

During the vertical retrace interval, the line rate modulation of vertical deflection current $i_V$ changes from a negative going amplitude modulation during the first half of vertical retrace, similar to the negative going amplitude modulation 48n illustrated in FIG. 6c, to a positive going amplitude modulation during the second half of vertical retrace, similar to the amplitude modulation 48p of FIG. 6c. The reversal of the direction of amplitude modulation of field deflection current $i_V$ is produced by a reversal in the phases of resonant voltage V1 and correction current $i_1$ in transformer T1 during the vertical retrace interval. The phase reversal is accomplished when the modulation envelopes of voltage V1 and current $i_1$ decrease to zero height at some point within the vertical retrace interval. Beyond that point, the modulation envelopes begin to increase in height.

In accordance with an inventive feature, control circuit 126 of FIG. 3 varies the height of the modulation envelopes during vertical retrace in a manner that permits the modulation envelopes to attain their proper heights at the beginning of the vertical trace interval.

Figure 11:
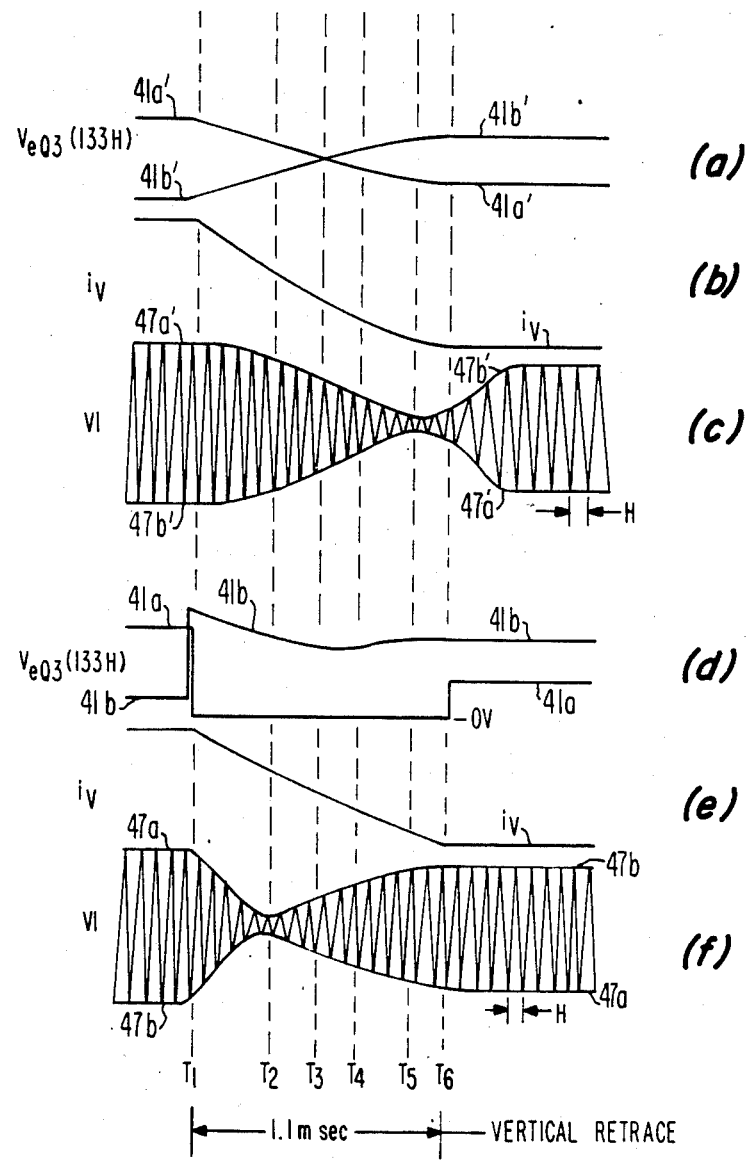

LC resonant circuit 22 tends to introduce an undesirable delay into the change of the heights of the modulation envelope of voltage V1 and current $i_1$, as will now be explained. Assume, for explanatory purposes, that control circuit 126 does not compensate for such undesirable delay. During the vertical retrace interval, between times $T_1-T_6$ of FIGS. 11a-11f, the envelope 41a' and 41b' of control voltage $V_{eQ3}$ of FIG. 11a decreases to zero height at time $T_3$, the center of the vertical retrace interval, when vertical deflection current $i_V$ of FIGS. 11b and 11e is zero. For better clarity, the line rate modulation of deflection current $i_V$ and voltage $V_{eQ3}$ is omitted from illustration in FIG. 11.

Due to the circulating energy in LC resonant circuit 22, the envelope 47a' and 47b' of oscillatory voltage V1 of FIG. 11c does not decrease to zero height until the later instant $T_5$. The result is that the height of the modulation envelope of oscillatory V1 has not reached its proper value by time $T_6$, the beginning of the vertical trace interval. As illustrated in FIG. 11c, the envelope height is still increasing rather than decreasing for a significant number of raster lines after the start of vertical trace. Thus, the raster lines scanned at the start of vertical trace will have incorrect amounts of north-south pincushion correction.

As mentioned earlier, it is the circulating energy in resonant circuit 22, which in turn is related to the Q of resonant circuit 22, that is responsible for the introduced delay. Phase and amplitude reversal during vertical retrace could have been speeded up by reducing the Q of resonant circuit 22. The result would have been an increased power consumption and distorted sine and cosine waveforms since the filtering action of resonant circuit 22 would have been reduced.

In accordance with an inventive aspect, control circuit 126 of FIG. 3 provides delay compensation to control voltage $V_{eQ3}$ to insure that the modulation envelope of oscillatory voltage V1 achieves its proper height at the beginning of the vertical trace interval. To compensate for the delay in envelope crossover of oscillatory voltage V1, control circuit 126 changes the phase and modifies the amplitude variation of line rate control voltage 133H during the vertical retrace interval. The crossover of the modulation envelope of oscillatory voltage V1 is thereby advanced to the instant $T_2$ of FIG. 11f, prior to the center of the vertical retrace interval at time $T_3$.

To produce the phase change and amplitude modification, the output of a comparator U2B is coupled to the output of control switch U2A and the output of a comparator U2D is coupled via a capacitor $C_{19}$ and a diode D3 to the output of control switch U2C. A resistor $R_{56}$ is coupled between ground and the junction of capacitor $C_{19}$ and diode D3. Vertical sawtooth control voltage $V_D$ is differentiated by an RC network comprising resistors $R_{44}$ and $R_{47}$ and capacitors $C_{12}$ and $C_{13}$. The differentiated voltage developed across resistor $R_{47}$ is applied to the inverting input terminal of comparator U2B and to the noninverting input terminal of comparator U2D. During the vertical retrace interval, control voltage $V_D$ is a sharply sloped, positive going, sawtooth signal. The differentiation of voltage $V_D$ therefore produces a relatively large positive voltage across resistor $R_{47}$ during the vertical retrace interval and a much smaller negative voltage during the vertical trace interval.

During the vertical retrace interval, the large positive, differentiated voltage at the inverting input terminal of comparator U2B switches the output of the comparator to ground. Line rate switching voltage 127H ceases to be generated during the vertical retrace interval. Thus, during the vertical retrace interval, $T_1-T_6$, of FIG. 11d the envelope portion 41a of control voltage $V_{eQ3}$ is switched at zero volts by comparator U2B.

During the vertical trace interval, comparator U2D is in saturation and discharges capacitor $C_{19}$ through resistor $R_{56}$. Diode D3 is reverse biased and disconnects comparator U2D from control switch U2C. During the vertical retrace interval, the differentiated voltage across resistor $R_{47}$ cuts off comparator U2D.

Capacitor $C_{19}$ charges from the +25V source through resistor $R_{55}$ and resistor $R_{56}$. The major portion of the charge current from capacitor $C_{19}$ passes through diode D3 and then divides between the output of control switch U2C and resistor $R_{41}$. During each horizontal deflection cycle, the charge current of capacitor $C_{19}$ passes through resistor $R_{41}$ when control switch U2C is cut off and is bypassed to ground when control switch U2C is conductive. The charge current of capacitor $C_{19}$ produces a positive voltage drop across resistor $R_{41}$ which adds to the positive going sequence of voltage levels of waveform 128H during vertical retrace. The added voltage is highest at time $T_1$ of FIG. 11d and ceases towards time $T_4$ when the charge current of capacitor $C_{19}$ decreases to zero. The result of the above explained operation of comparators U2B and U2D is that envelope portion 41a of FIG. 11d is switched to zero during the interval $T_1$ to $T_6$ and that an extra voltage, decreasing in amplitude, is added to the original envelope portion 41b from time $T_1$ to time $T_4$.

Comparing the envelope 41a and 41b of control voltage $V_{eQ3}$ in FIG. 11d with the envelope 41a' and 41b' in FIG. 11a, one notes that throughout vertical retrace, between times $T_1-T_6$, the envelope height in FIG. 11d is of relatively large value. The result is that control voltage 133H is of large amplitude during the entirety of vertical retrace.

Furthermore, because the line rate modulation of control voltage $V_{eQ3}$ is provided solely by switching signal 128H during vertical retrace, control voltage 133H has the same phase during all of vertical retrace as it has at the beginning of the subsequent vertical trace interval. Thus, during the entirety of vertical retrace, line rate excitation current pulses $i_{Q4}$ are produced with the same phase that they have at the start of vertical trace.

The excitation current pulses $i_{Q4}$ during vertical retrace develop an oscillatory voltage V1, illustrated in FIG. 11f that has an envelope 47a and 47b that decreases to zero height substantially faster than the coresponding envelope 47a' and 47b' in FIG. 11c. The envelope reaches the zero height point in FIG. 11f at the advanced time $T_2$. A much longer time interval, $T_2$-$T_6$, is available for the envelope to begin increasing in height to its start of trace value at time T6. Thus, by using comparators U2B and U2D, control circuit 126 provides amplitude delay compensation to voltage V1 during vertical retrace. The degree of compensation is controlled by proper selection of the time constant of resistor $R_{55}$ and capacitor $C_{19}$ to avoid an overshoot of the line rate correction amplitude at time $T_6$, the beginning of vertical trace.

It should be noted, that for the purposes of clarity of explanation, the line rate modulation of the waveforms of FIGS. 11a, 11b, 11d, and 11e have been omitted from illustration.

Because vertical deflection amplifier 21 may exhibit significant output impedance at the line frequency, the line rate modulation of vertical deflection current $i_V$ tends to produce a line rate component to output voltage 21V. Integrated circuit vertical deflection amplifiers may not permit the use of a sufficiently large supply voltage to avoid producing voltage limiting effects. The result may be a nonlinear drive at the top and bottom of field scan.

To avoid voltage limiting effects, a capacitor $C_{18}$, damped by a resistor $R_{53}$, advantageously tunes vertical deflection winding $L_V$ to approximately the line frequency. The line rate correction component of vertical deflection current $i_V$ circulates in the parallel tuned circuit formed by winding $L_V$ and capacitor $C_{18}$. The branch of the series connected capacitor $C_{18}$ and resistor $R_{53}$ provides a line rate current return path. The result is that a lower magnitude line rate voltage appears at the output of vertical deflection amplifier 21.

What is claimed:

1. A north-south pincushion correction circuit, comprising:
   a field deflection winding;
   a field deflection amplifier for generating field deflection current in said deflection winding;
   an LC resonant circuit coupled to said field deflection winding and receiving field deflection current therefrom;
   a switching amplifier coupled to said LC resonant circuit;
   means for developing a field rate input signal;
   means for developing a line rate input signal; and
   a control circuit coupled to said switching amplifier and responsive to said line rate input signal for switching conductive levels of said switching amplifier at a line rate between first and second levels of conduction, thereby exciting said LC resonant circuit at a line rate to produce line rate modulation of said field deflection current, said control circuit being responsive to said field rate input signal for varying both said first and second levels of conduction at said field rate to provide north-south pincushion correction of said field deflection current.

2. A north-south pincushion correction circuit according to claim 1 wherein said control circuit switches conductive levels of said switching amplifier at a line rate with a substantially 50% duty cycle.

3. A north-south pincushion correction circuit according to claim 1 wherein said LC resonant circuit comprises a capacitor coupled to a first winding of a transformer, a second winding of said transformer being coupled to said switching amplifier.

4. A north-south pincushion correction circuit according to claim 3 wherein the inductance of said transformer is adjustable to control the phase of the line rate modulation of said field deflection current.

5. A north-south pincushion correction circuit according to claim 3 wherein said control circuit switches conductive levels of said switching amplifier at a line rate with a substantially 50% duty cycle.

6. A north-south pincushion correction circuit according to claim 2 wherein said control circuit increases said first level of conduction decreases said second level of conduction during field scan.

7. A north-south pincushion correction circuit according to claim 2 wherein said control circuit comprises first and second control amplifiers responsive to said field rate inbput signal for developing inverted and noninverted field rate sawtooth signals at respective control amplifier outputs and first and second control switches coupled to the respective outputs of said first and second control amplifiers and being responsive to said line rate signal for switching the outputs of said control switches between conductive and nonconductive states at a line rate in phase opposition to each other.

8. A north-south pincushion correction circuit according to claim 1 wherein said control circuit changes the switching of conductive levels of said switching amplifier during the field retrace interval in a manner that advances the time that said line rate modulation reaches zero amplitude within the field retrace interval to an instant that occurs prior to the center of the field retrace interval.

9. A north-south pincushion correction circuit according to claim 1 wherein said field rate input signal is of generally sawtooth waveshape to enable said control circuit to vary the envelope of the line rate modulation of said field deflection current in a generally sawtooth manner, wherein said north-south pincushion correction circuit is used in conjunction with raster scanning in a picture tube having an aspherical faceplate, and wherein said control circuit includes means for nonlinearly waveshaping said envelope to correct remaining north-south pincushion distortion.

10. A north-south pincushion correction circuit according to claim 9 wherein the curvature of said faceplate at the center of the faceplate differs from the curvature nearer the edges to provide faceplate edges that are substantially in one plane.

11. A north-south pincushion correction circuit according to claim 9 wherein said control circuit includes means for asymmetrically adjusting the envelope height to provide a greater envelope height at one of the beginning and end of field scan than at the other one of the beginning and end of field scan.

12. A north-south pincushion correction circuit according to claim 1 including a capacitor in parallel with said field deflection winding for forming a tuned circuit therewith at substantially the line frequency to reduce the line rate voltage applied to the output of said field deflection amplifier.

13. A north-south pincushion correction circuit according to claim 12 including a damping resistance series coupled with said capacitor in a branch parallel to said field deflection winding for providing a line rate current return path.

14. A north-south pincushion correction circuit, comprising:
- a field deflection winding;
- a field deflection amplifier for generating field deflection current in said deflection winding;
- an LC resonant circuit coupled to said field deflection winding and receiving field deflection current therefrom;
- a switching amplifier coupled to said LC resonant circuit;
- means for developing a field rate input signal;
- means for developing a line rate input signal; and
- a control circuit coupled to said switching amplifier and responsive to said line rate input signal for developing a control signal that switches conductive levels of said switching amplifier at a line rate with a substantially 50 percent duty cycle, thereby exciting said LC resonant circuit at a line rate to produce line rate modulation of said field deflection current, said control circuit being responsive to said field rate input signal for varying the line rate modulation of said field deflection current at a field rate to provide north-south pincushion correction.

15. In a television display apparatus that provides for raster scanning in conjunction with a picture tube that includes an aspherical faceplate of relatively flat contour, a north-south pincushion correction circuit, comprising:
- a field deflection winding;
- a field deflection amplifier for generating field deflection current in said field deflection winding;
- means for producing line rate modulation of said field deflection current;
- means for varying at a field rate the envelope of the line rate modulation of said field deflection current; and
- means for nonlinearly waveshaping said envelope to provide a north-south pincushion corrected field deflection current that includes correction of remaining north-south pincushion distortion associated with raster-scanning in conjunction with said picture tube.

16. In a television display apparatus that provides for raster scanning in conjunction with a picture tube that includes an aspherical faceplate of relatively flat contour, a north-south pincushion correction circuit, comprising:
- a field deflection winding;
- a field deflection amplifier for generating field deflection current in said field deflection winding;
- an LC resonant circuit coupled to said field deflection winding; and
- means responsive to line and field rate input signals for exciting said LC resonant circuit into oscillation to generate a line rate voltage that is applied to said field deflection winding and has an envelope that varies at a field rate for providing north-south pincushion correction to said field deflection current,
- wherein said exciting means generates said envelope in a manner that enables said envelope to reach zero height within said field retrace interval at an advanced time prior to the center of the field retrace interval.

17. A north-south pincushion correction circuit, comprising:
- a vertical deflection circuit;
- means for generating a vertical rate sawtooth signal;
- means for generating a horizontal rate signal;
- a controllable switch;
- a control circuit coupled to said switch and responsive to said vertical rate sawtooth signal and to said horizontal rate signal for changing conduction of said switch between first and second levels at a horizontal rate, both of said first and second levels varying at a vertical rate in a generally sawtooth manner; and
- a tuned transformer coupled to said controllable switch and to said vertical deflection circuit for providing thereto north-south pincushion correction.

18. A north-south pincushion correction circuit according to claim 17 wherein said control circuit changes conduction of said switch between first and second levels at a horizontal rate of subtantially 50% duty cycle.

19. A north-south pincushion correction circuit according to claim 17 wherein said north-south pincushion correction circuit is used in conjunction with raster scanning in a picture tube having an sspherical faceplate where the curvature at the center is less than the curvature at an edge, and wherein said control circuit includes means for nonlinearly waveshaping said vertical rate sawtooth signal to correct remaining north-south pincushion distortion.

20. A north-south pincushion correction circuit according to claim 17 wherein said controllable switch excites said tuned transformer into developing a horizontal rate sinusoidal voltage that is applied to said vertical deflection circuit, the envelope of said sinusoidal voltage varying at a vertical rate in accordance with said vrtical rate sawtooth signal, and wherein said control circuit includes means responsive to a signal indicative of vertical retrace for advancing the time that said envelope reaches zero height within the vertical retrace interval to an instant that occurs prior to the center of vertical retrace.

* * * * *

UNITED STATES PATENT AND TRADEMARK OFFICE
CERTIFICATE OF CORRECTION

PATENT NO. : 4,668,897

DATED : May 26, 1987

INVENTOR(S) : PETER EDUARD HAFERL

It is certified that error appears in the above-identified patent and that said Letters Patent is hereby corrected as shown below:

Column 18, line 49 that portion reading "vrtical" should read --vertical--.

On the title sheet under "Foreign Application Priority Data" that portion reading "Jun. 12, 1985" should read --Jun. 12, 1984--.

Signed and Sealed this

Ninth Day of August, 1988

Attest:

DONALD J. QUIGG

*Attesting Officer*  *Commissioner of Patents and Trademarks*